(12) United States Patent
Liao

(10) Patent No.: US 11,211,841 B2
(45) Date of Patent: Dec. 28, 2021

(54) MOTOR SHELL

(71) Applicant: GUILIN ZHISHEN INFORMATION TECHNOLOGY CO., LTD., Guzngxi (CN)

(72) Inventor: Yilun Liao, Guangxi (CN)

(73) Assignee: GUILIN ZHISHEN INFORMATION TECHNOLOGY CO., LTD., Guzngxi (CN)

( * ) Notice: Subject to any disclaimer, the term of this patent is extended or adjusted under 35 U.S.C. 154(b) by 151 days.

(21) Appl. No.: 16/069,105

(22) PCT Filed: Apr. 9, 2018

(86) PCT No.: PCT/CN2018/082302
§ 371 (c)(1),
(2) Date: Jul. 10, 2018

(87) PCT Pub. No.: WO2018/188549
PCT Pub. Date: Oct. 18, 2018

(65) Prior Publication Data
US 2021/0211011 A1   Jul. 8, 2021

(30) Foreign Application Priority Data

Apr. 11, 2017  (CN) .......................... 201710232750.5
Apr. 11, 2017  (CN) .......................... 201710233007.1

(51) Int. Cl.
*H02K 5/08* (2006.01)
*H02K 5/02* (2006.01)
(Continued)

(52) U.S. Cl.
CPC ............... *H02K 5/08* (2013.01); *F16M 11/06* (2013.01); *H02K 5/02* (2013.01); *H02K 5/165* (2013.01);
(Continued)

(58) Field of Classification Search
CPC .......... H02K 5/08; H02K 5/165; F16M 11/06; F16M 13/04
See application file for complete search history.

(56) References Cited

U.S. PATENT DOCUMENTS

| | | |
|---|---|---|
| 3,469,128 A | 9/1969 | Cartier |
| 6,753,636 B2 | 6/2004 | Rehm et al. |

(Continued)

FOREIGN PATENT DOCUMENTS

| | | |
|---|---|---|
| CN | 2103216 U | 4/1992 |
| CN | 1949632 A | 4/2007 |

(Continued)

*Primary Examiner* — Tulsidas C Patel
*Assistant Examiner* — Riley Owen Stout
(74) *Attorney, Agent, or Firm* — Rimon, P.C.

(57) ABSTRACT

The present invention provides a motor shell, comprising a hollow metal shaft and a plastic shell, wherein the hollow metal shaft is fixedly connected to the plastic shell, and the connection between the hollow metal shaft and the plastic shell is one of injection molding connection, glue connection and interference connection. By using the motor shell according to the present invention, problems in the prior art such as low processing precision of the motor shaft, poor wiring structure, low structural strength, no limiting for the magnetic ring and tending to deform after loading are solved.

18 Claims, 9 Drawing Sheets

(51) Int. Cl.
  *H02K 7/00* (2006.01)
  *H02K 7/14* (2006.01)
  *F16M 11/06* (2006.01)
  *H02K 5/16* (2006.01)
  *F16M 13/04* (2006.01)

(52) U.S. Cl.
  CPC .............. *H02K 7/003* (2013.01); *H02K 7/14* (2013.01); *F16M 13/04* (2013.01)

(56) References Cited

U.S. PATENT DOCUMENTS

| | | | | |
|---|---|---|---|---|
| 10,183,762 | B2* | 1/2019 | Zhao | F16M 11/18 |
| 10,488,739 | B2* | 11/2019 | Zhou | H02K 1/27 |
| 2011/0175465 | A1* | 7/2011 | Huck | F16H 57/039 |
| | | | | 310/43 |
| 2011/0175479 | A1 | 7/2011 | Marchitto et al. | |
| 2016/0381271 | A1* | 12/2016 | Cheng | F16M 13/00 |
| | | | | 348/208.2 |

FOREIGN PATENT DOCUMENTS

| | | | |
|---|---|---|---|
| CN | 201004573 | Y | 1/2008 |
| CN | 201043534 | Y | 4/2008 |
| CN | 102820749 | A | 12/2012 |
| CN | 105406630 | A | 3/2016 |
| CN | 105553161 | A | 5/2016 |
| CN | 106849453 | A | 6/2017 |
| CN | 206619984 | U | 11/2017 |
| CN | 206759201 | U | 12/2017 |
| DE | 10026467 | A1 | 12/2001 |
| EP | 2919064 | A1 | 9/2015 |
| JP | 2007263225 | A | 10/2007 |
| WO | WO-2011133320 | A2 | 10/2011 |

* cited by examiner

MOTOR SHELL

CROSS-REFERENCE TO RELATED APPLICATIONS

This application is a national stage application (under 35 U.S.C. § 371) of PCT/CN2018/082302, filed Apr. 9, 2018, which claims benefit of Chinese Application No. 201710232750.5, filed Apr. 11, 2017, and Chinese Application No. 201710233007.1, also filed Apr. 11, 2017, all of which are incorporated herein by reference in their entirety.

TECHNICAL FIELD

The present invention belongs to the technical field of motors and particularly relates to a motor shell.

BACKGROUND

At present, with people's pursuit of lightweight and cost-effective handheld stabilizers, it is desirable to reduce the weight and the production cost of handheld stabilizers, and the key to weight and production cost reduction lies in the improvement of the metal shell of motors.

Motors in the prior art usually use all-metal shells and all-metal shafts, which have the disadvantages of long manufacturing cycle, complex manufacturing process and high difficulty in post processing. Meanwhile, the characteristics of metal shells mean that they need to be milled, and their weight and manufacturing cost are high. Some motors in the prior art are made of plastic material, which can solve the disadvantages of long production cycle, high procurement price, large weight and poor appearance designability, etc. However, due to the characteristics of the plastic material itself, the machining precision of the motor shaft made of plastic material cannot meet the requirement on precision (micron level, i.e., 0.001 mm) and the motor shaft tends to deform after loading.

Some of motors in the prior art are also made of plastic material, with shafts and shells not integrally formed. As a result, the wiring structure is poor, the strength is low and it is difficult to drive the loads to run for a long period of time. For example, in Chinese Patent Application Publication CN102820749A, entitled "PROCESS FOR MANUFACTURING MOTOR SHELL FOR AUTOMOTIVE GLASS LIFTER", thermosetting plastic BMC or SMC which has great mechanical property, thermal resistance and chemical corrosion resistance and is suitable for various manufacturing processes is selected as the shell material, and the final shell product is superior to the iron shell manufactured by traditional processes in terms of performances and indicators. It is known from the above content that the motor shell and shaft are not integrally formed in the prior art, and there are still deficiencies such as poor wiring structure, low strength, tending to deform after loading, and difficulty in driving the load to run for a long period of time.

SUMMARY

An objective of the present invention is to provide a motor shell, to solve problems in the prior art such as low processing precision of the motor shaft, poor wiring structure, low structural strength, no limiting for the magnetic ring and tending to deform after loading.

To achieve the technical effects, according to one aspect of the present invention, a motor shell is provided, comprising: a hollow metal shaft and a plastic shell, wherein the hollow metal shaft is fixedly connected to the plastic shell.

Preferably, the connection between the hollow metal shaft and the plastic shell is one of injection molding connection, glue connection and interference connection.

Preferably, a stopping structure is arranged on an outer side of a bottom end of the hollow metal shaft. The stopping structure can efficiently prevent displacement between the hollow metal shaft and the plastic shell.

Preferably, the stopping structure is at least one of a convex structure, a concave structure and an irregularly deformed structure. A stopping structure can be used in the case of low load, and more stopping structures can be used simultaneously in the case of high load, so that the motor shell can be more stable.

Preferably, a fastening structure is arranged on an outer side of a top end of the hollow metal shaft, which facilitates tightness between the hollow metal shaft and bearings.

Preferably, the fastening structure is one of a threaded structure, a snap-fit structure and a mortise and tenon structure. The above fastening structures are structures with optimal fastening effect.

Preferably, the connection between the hollow metal shaft and the plastic shell is threaded connection, which can guarantee the tightness between the hollow metal shaft and the plastic shell.

Preferably, the plastic shell is of a cylindrical shape with one end open and comprises an annular wall and a bottom plate. The hollow metal shaft is arranged on a central axis of the plastic shell and is fixedly connected to an inner side of the bottom plate.

Preferably, there is a lead trough on an outer side of the bottom plate, which is communicated with the interior of the hollow metal shaft, thus the wiring structure is more rational, and leads can be wired through the hollow metal shaft and the shell.

Preferably, reinforcing ribs are arranged on the inner side of the bottom plate to ensure the withstand strength of the shell, so that the motor shell can bear higher load.

Preferably, the motor shell further comprises a magnetic ring and a plurality of limiting stands arranged on an inner side of the annular wall, wherein one end of each of the limiting stands is fixed to an end of the reinforcing rib and the other end thereof is abutted against the magnetic ring to limit the mounting position for the magnetic ring of a motor.

Preferably, there is a rotary stopper on an outer wall of the annular wall.

Preferably, the plastic shell and the hollow metal shaft form a motor shell for a handheld stabilizer.

Preferably, the plastic shell is made of polyaryl amides which can achieve extremely high strength and has great chemical resistance and dimensional stability.

According to another aspect of the present invention, a motor is provided, comprising: the motor shell, a motor end cover, motor iron cores and an iron core carrier, wherein one end of the iron core carrier is detachably connected to the motor end cover and the other end thereof carries the motor iron cores.

Preferably, the motor further comprises an upper bearing and a lower bearing, wherein the upper bearing and the lower bearing are fixed on the iron core carrier, and a hollow metal motor shaft passes through the upper bearing, the iron core carrier and the lower bearing.

The present invention has the following advantages:

1. The hollow metal shaft and the plastic shell are designed integrally, so that the tightness between the hollow metal shaft and the plastic shell is improved and it is more convenient for wiring;

2. The stopping structure arranged on the shell can efficiently prevent displacement between the hollow metal shaft and the plastic shell;

3. Limiting stands are arranged on the inner wall of the shell to greatly limit the mounting position for the magnetic ring of the motor, so that the magnetic ring can closely fit with the iron cores;

4. Plastic reinforcing ribs are arranged on the plastic shell to guarantee the withstand strength of the shell, so that the motor shell can bear higher load; and 5. The designed hollow metal shaft has high machining precision and is less likely to deform under high load.

BRIEF DESCRIPTION OF THE DRAWINGS

The embodiments of the present invention will be further described below with reference to the accompanying drawings, in which.

Figure 1:
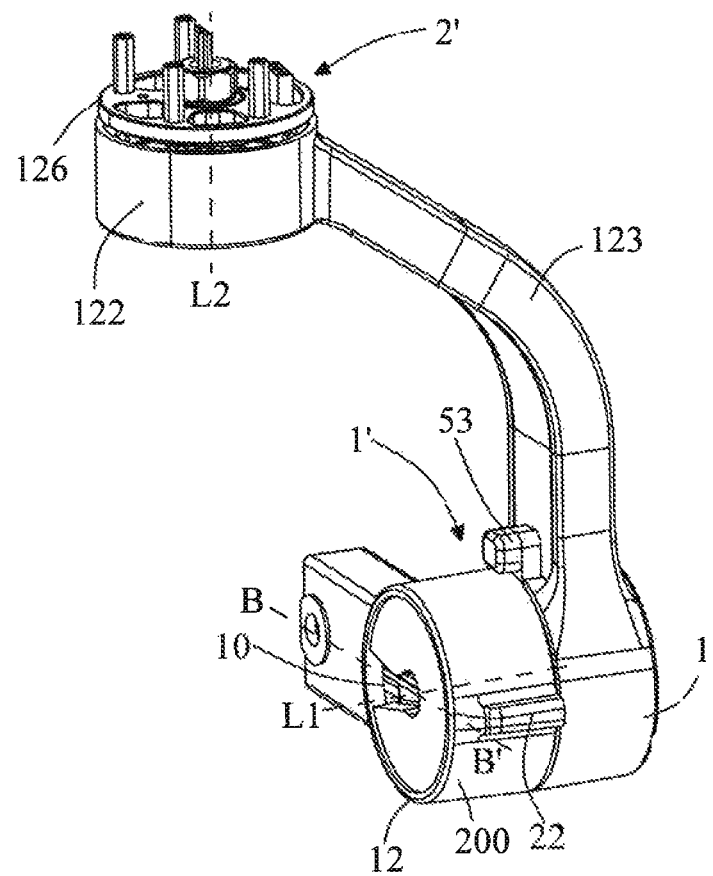
FIG. 1 is a schematic perspective view of a part of a handheld stabilizer according to a first embodiment of the present invention.

REFERENCE NUMERALS 1 motor end cover
200 plastic shell
100 hollow metal shaft
4 motor iron core
5 iron core carrier
51 annular boss
52 limiting structure
6 upper bearing
7 lower bearing
102 fastening structure
101 stopping structure
202 lead trough
11 screw
12 motor shell
13 lead strand
1' first plastic motor
11' first plastic motor
2' second plastic motor
22' second plastic motor
3' third plastic motor
122 motor shell
123 connecting arm
123' connecting arm
1231 wiring groove
124 hollow metal shaft
125 connecting arm
126 iron core carrier
127 handle
1220 lead trough
21 receiving space
22 rotary stopper
23 hollow metal shaft
25 magnetic ring
206 annular wall
205 bottom plate
201 limiting stand
203 reinforcing rib
231 snap-fit structure
239 groove
239' projection
31 locking end
32 fixing end
31' motor end cover
32' motor shell
33 hollow metal shaft
339' projection
331 mortise structure
41 limiting groove
53 rotary limiting member
54 threaded hole

DETAILED DESCRIPTION

To make the objectives, technical solutions and advantages of the present invention more clear, the present invention will be further described below in details with reference to the accompanying drawings by way of specific embodiments.

FIG. 1 is a schematic perspective view of a part of a handheld stabilizer according to a first embodiment of the present invention. As shown in FIG. 1, the handheld stabilizer comprises a first plastic motor 1', a second plastic motor 2' and a connecting arm 123 connecting the two plastic motors together. The first plastic motor 1' is substantially cylindrical, comprising a motor end cover 1 and a motor shell 12 opposite to each other, and motor iron cores 4 and an iron core carrier 5 provided in the interior of the motor shell 12 and the motor end cover 1 (referring to FIG. 2). The motor shell 12 comprises a plastic shell 200 made of plastic material, a lead trough 202 provided on the plastic shell 200, and a rotary stopper 22 provided on an outer wall of the plastic shell 200. Rotation of the rotary stopper 22 is limited by a rotary limiting member 53 (which will be described below with reference to FIG. 2). FIG. 1 also shows a motor shell 122 and an iron core carrier 126 of the second plastic motor 2', wherein the iron core carrier 126 is arranged in the interior of a handle 127 (referring to FIG. 12) of the handheld stabilizer. A central axis L2 of the motor shell 122 is perpendicular to a central axis L1 of the motor shell 12. The motor shell 122 of the second plastic motor 2' is connected to the motor end cover 1 of the first plastic motor 1' by the curved connecting arm 123. The second plastic motor 2' has basically the same structure as the first plastic motor 1', thus the structure thereof will be described below with reference to the first plastic motor 1'.

Figure 2:
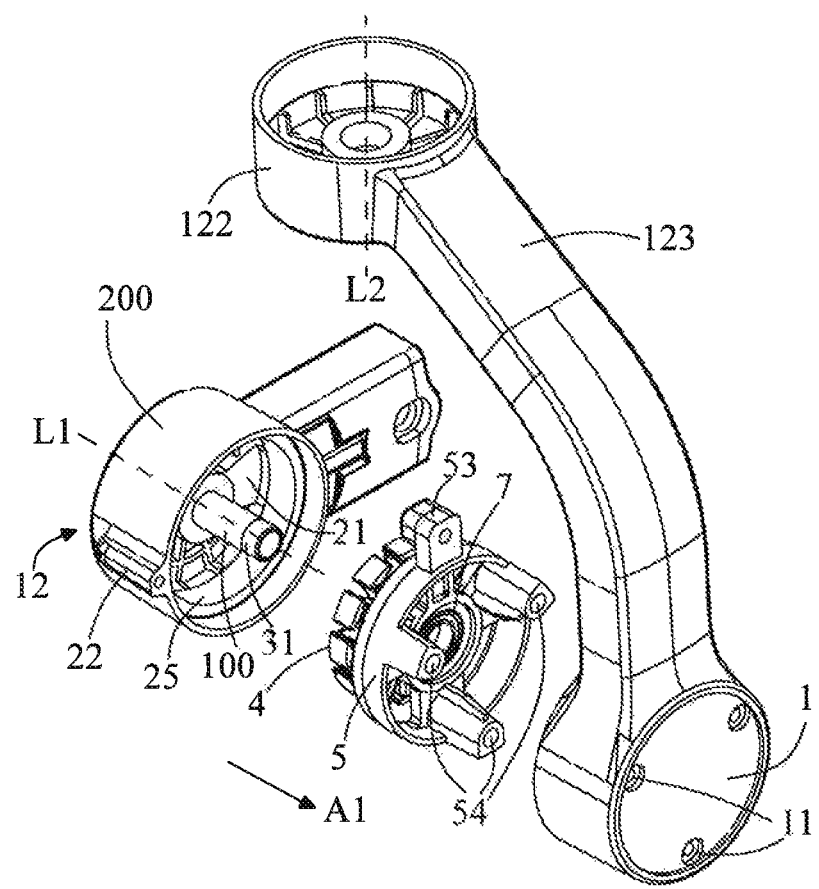
FIG. 2 is an exploded view of a first plastic motor for the handheld stabilizer of FIG. 1.

FIG. 2 is an exploded view of the first plastic motor 1' for the handheld stabilizer of FIG. 1. As shown in FIG. 2, the first plastic motor 1' comprises three parts: the motor end cover 1, the iron core carrier 5 and the motor shell 12, wherein the motor end cover 1 is of a cylindrical shape with one end open and forms a part of the connecting arm 123, and three through holes are formed in its end surface for nuts 11 to pass through. The iron core carrier 5 is substantially annular, and three threaded holes 54 corresponding to the three through holes are formed in its periphery. The nuts 11 can be fastened in the threaded holes 54 after passing through the through holes in the motor end cover 1, so that the iron core carrier 5 is detachably connected to the motor end cover 1. The motor iron cores 4 are fixedly mounted on the iron core carrier 5, a rotary limiting member 53 is provided on the outer edge of the iron core carrier 5, and an upper bearing 6 (referring to FIG. 7) and a lower bearing 7 opposite to each other are mounted at two opposite ends in the interior of its hollow center.

The motor shell 12 comprises a plastic shell 200 of a cylindrical shape with one end open, which defines a cylindrical receiving space 21. The motor shell 12 also comprises an annular magnetic ring 25 provided in the receiving space 21 and fixed on an inner wall of the plastic shell 200, and a hollow metal shaft 100. The hollow metal shaft 100 is coincided with the central axis L1 of the plastic shell 200, is made of metal material, and has a locking end 31 and a fixing end (referring to FIGS. 5 and 6) opposite to each other. The fixing end of the hollow metal shaft 100 is fixedly connected to an inner side of the plastic shell 200.

Figure 3:
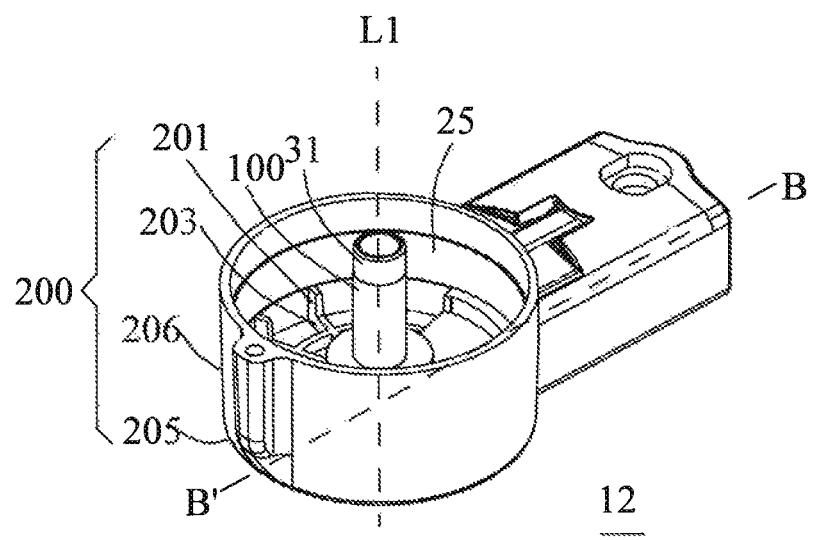
FIG. 3 is an enlarged perspective view of a motor shell shown in FIG. 2.
Figure 4:
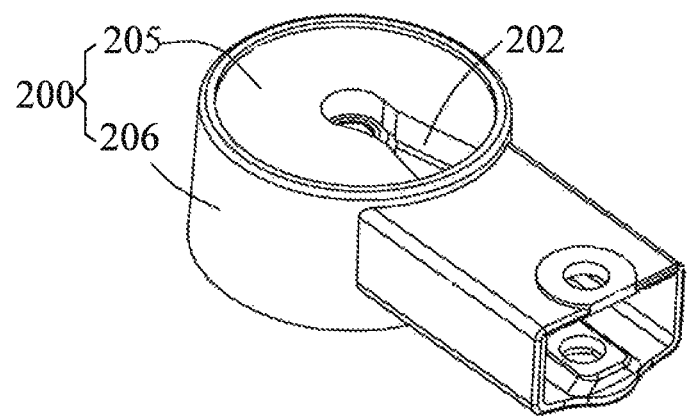
FIG. 4 is a bottom view of the motor shell shown in FIG. 3.
Figure 5:
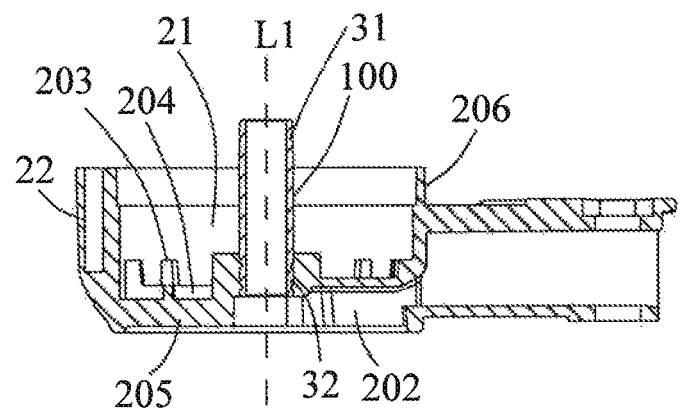
FIG. 5 is a sectional view of the motor shell shown in FIG. 3.

FIG. 3 is an enlarged perspective view of the motor shell 12 of FIG. 2, FIG. 4 is a bottom view of the motor shell 12 of FIG. 3, and FIG. 5 is a sectional view of the motor shell 12 of FIG. 3, with the sectional plane going through the central axis L1 and a line B-B'. As shown in FIGS. 3 to 5, the plastic shell 200 is integrally molded by plastic material, comprising an annular wall 206, a bottom plate 205, a plurality of reinforcing ribs 203 provided on the bottom plate 205, and a plurality of limiting stands 201 provided on an inner side of the annular wall 206. The reinforcing ribs 203 are radially distributed around the center of the bottom plate 205 and are linear to improve the mechanical strength of the bottom plate 205. The limiting stands 201 are uniformly distributed along the inner side of the annular wall 206. One end of each of the limiting stands 201 is fixed to an end of the reinforcing rib 203 and the other end thereof is abutted against the mounted magnetic ring 25 to support and limit the magnetic ring 25, so that the magnetic ring 25 is fixed in the desired position. The reinforcing ribs 203 and the limiting stands 201 are integrally formed with the plastic shell 200 by using injection molding process, and the fixing end 32 of the hollow metal shaft 100 is fixedly connected to the bottom plate 205 by using injection molding process.

The plastic shell 200 is provided with the lead trough 202 which is arranged on an outer side of the bottom plate 205 and radially extends along the bottom plate 205, and is communicated with the interior of the hollow metal shaft 100.

Figure 6:
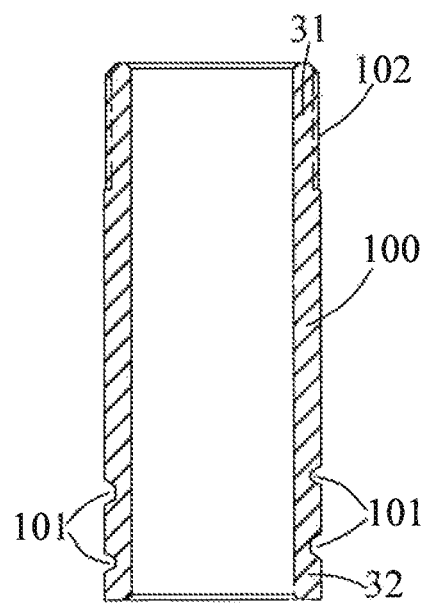
FIG. 6 is an enlarged sectional view of a hollow metal shaft shown in FIG. 5.

FIG. 6 is an enlarged sectional view of the hollow metal shaft of FIG. 5. As shown in FIG. 6, the hollow metal shaft 100 is tubular, and a plurality of groove-shaped stopping structures 101 are formed on an outer wall of the fixing end 32. A threaded fastening structure 102 is formed at the locking end 31 of the hollow metal shaft 100.

Figure 7:
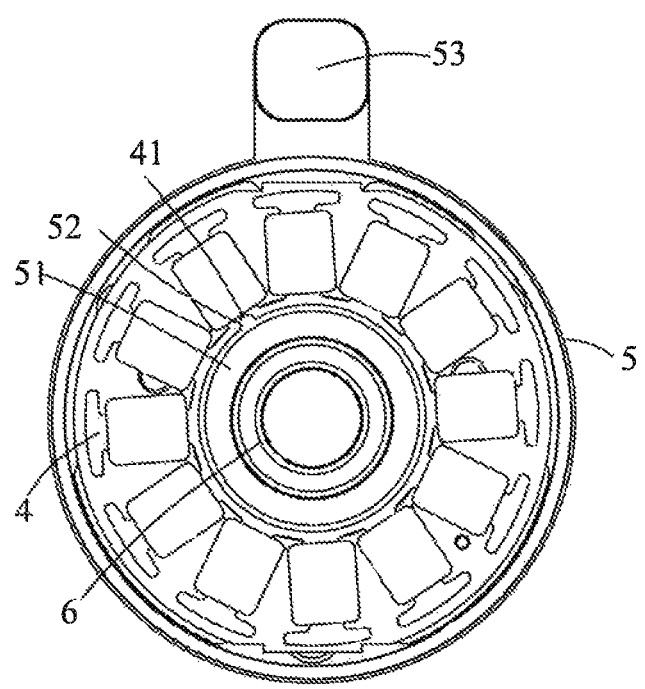
FIG. 7 is an enlarged planar view of motor iron cores and an iron core carrier shown in FIG. 2 in a direction shown by an arrow A1.

FIG. 7 is an enlarged planar view of the iron core carrier of FIG. 2 in a direction shown by an arrow A1. As shown in FIG. 7, the motor iron cores 4 are mounted on the iron core carrier and arranged along the iron core carrier radially and uniformly, an annular boss 51 is provided in vicinity of the center of the iron core carrier, and a limiting projection 52 is provided on an outer wall of the annular boss 51. A limiting groove 41 fitted with the limiting projection is provided on an inner side of the motor iron core 4. During the assembly of the motor iron cores 4 and the iron core carrier 5, the limiting groove 41 of the motor iron core 4 is first aligned with the limiting projection on the outer wall of the annular boss 51 in a direction parallel to the central axis L1, and then the annular boss 51 is sheathed in the motor iron core 4 to achieve fixed connection of the two.

Figure 8:
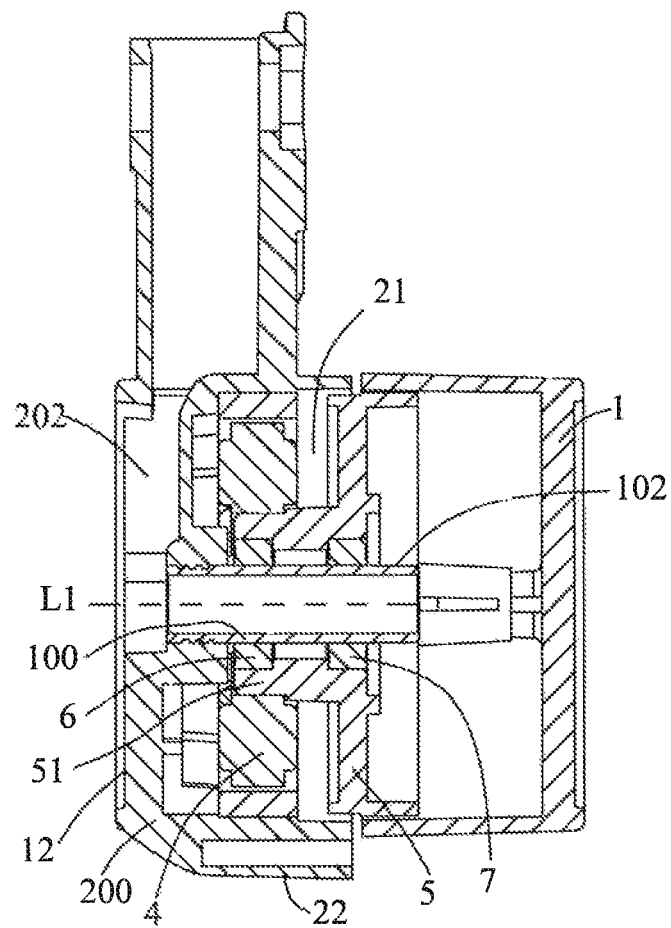
FIG. 8 is a sectional view of the first plastic motor for the handheld stabilizer of FIG. 1.

FIG. 8 is a sectional view of the first plastic motor 1' for the handheld stabilizer of FIG. 1, with the sectional plane going through the central axis L1 and the line B-B'. As shown in FIG. 8, the iron core carrier 5 comprises the annular boss 51 which uses the central axis L1 as a rotation axis. The motor iron core 4 is substantially annular, and its inner wall firmly surrounds the outer wall of the annular boss 51 and the two are fixedly connected. The plastic motor 1' further comprises an upper bearing 6 and a lower bearing 7 opposite to each other. The upper bearing 6 and the lower bearing 7 are fixed on the iron core carrier 5 and use the central axis L1 as a rotation axis as well. The hollow metal shaft 100 passes through the upper bearing 6 and the lower bearing 7, and can perform free rotation movement around the central axis L1.

Therefore, according to one aspect of the present invention, a motor shell is provided, comprising a hollow metal shaft 100 and a plastic shell 200, wherein the hollow metal shaft 100 is fixedly connected to the plastic shell 200.

The plastic shell 200 is provided with limiting stands 201 on an inner wall thereof.

The plastic shell 200 is provided with a lead trough 202.

The plastic shell 200 is provided with plastic reinforcing ribs 203.

The plastic shell and the hollow metal shaft form a motor shell of a handheld stabilizer.

The plastic shell is made of polyaryl amides.

The iron core carrier 5, the plastic shell 200 and the motor end cover 1 of the plastic motor 1' according to the above embodiment are made of polyaryl amides, which have light weight, great appearance designability and thus are suitable for commercial applications. Polyaryl amides have great chemical resistance and high strength and hardness, so that the motor keeps great stability. Also, polyaryl amides are easy to mold and do not need technological processes such as polishing and cleaning, so that the production efficiency is improved and the manufacturing cost is reduced.

According to the above embodiment of the present invention, the hollow metal shaft 100 is made of metal material, which has high processing precision and high mechanical strength and is less likely to deform during usage. Projections fitted with the groove-shaped stopping structures 101 on the fixing end 32 of the hollow metal shaft 100 are formed on the plastic shell 200 by using injection molding process, so that the plastic shell 200 and the hollow metal shaft 100 are firmly fixed together, and the stability of the plastic shell 200 and the hollow metal shaft 100 during rotation is improved. Threads are provided on an outer wall of the locking end 31 of the hollow metal shaft 100 and are used for connecting with nuts (not shown) to prevent the motor iron cores 4 and the iron core carrier 5 from sliding along the direction of the central axis L1, so that the plastic motor 1' can operate stably.

The limiting projection of the annular boss 51 is fitted with and fixedly connected with the limiting groove 41 of the motor iron core 4, which prevents the motor iron cores 4 from rotating relative to the iron core carrier 5 around the central axis L1, so that the operational stability of the plastic motor 1' is improved.

When the first plastic motor 1' is in the assembled state, the locking end 31 of the hollow metal shaft 100 passes through the upper bearing 6 and the lower bearing 7 in sequence. During anticlockwise or clockwise rotation of the motor shell 12 around the axis L1, the rotary stopper 22 of the motor shell 12 is blocked by the rotary limiting member 53. Therefore, the rotatable angle of the motor shell 12 is slightly smaller than 360°, which prevents leads provided in the hollow metal shaft 100 and the lead trough 202 from being twisted off due to excessive rotation.

Figure 9:
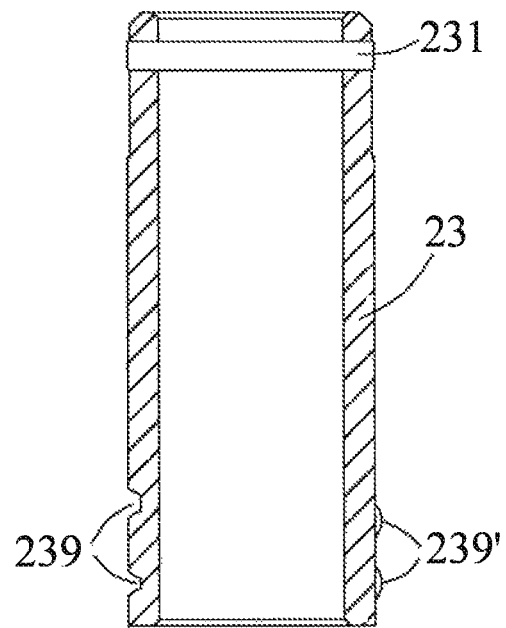
FIG. 9 is an enlarged sectional view of a hollow metal shaft in a plastic motor for a handheld stabilizer according to a second embodiment of the present invention.

FIG. 9 is an enlarged sectional view of a hollow metal shaft in a plastic motor for a handheld stabilizer according to a second embodiment of the present invention. A hollow metal shaft 23 shown in FIG. 9 is basically the same as the hollow metal shaft 100 shown in FIG. 6, and the difference lies in that there are a plurality of grooves 239 and a plurality of projections 239' on an outer wall of a fixed end of the hollow metal shaft 23, and a snap-fit structure 231 is provided on its locking end for detachably connecting with a fastener.

Figure 10:
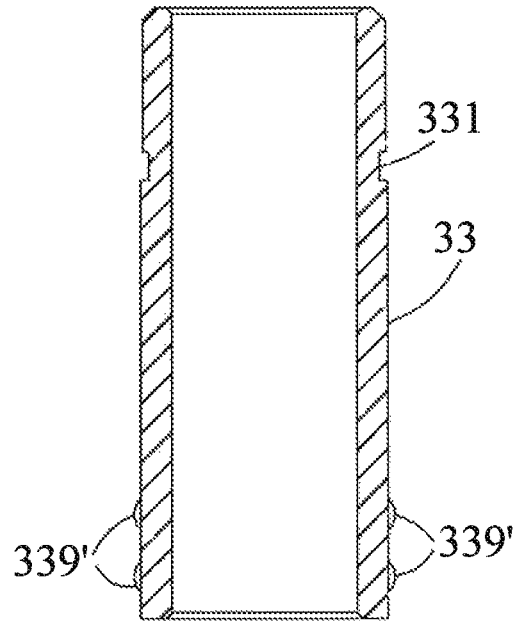
FIG. 10 is an enlarged sectional view of a hollow metal shaft in a plastic motor for a handheld stabilizer according to a third embodiment of the present invention.

FIG. 10 is an enlarged sectional view of a hollow metal shaft in a plastic motor for a handheld stabilizer according to a third embodiment of the present invention. A hollow metal shaft 33 shown in FIG. 10 is basically the same as the hollow metal shaft 100 shown in FIG. 6, and the difference lies in that there are a plurality of projections 339' on an outer wall of a fixed end of the hollow metal shaft 33, and a mortise structure 331 is provided on its locking end for detachably connecting with a tenon structure.

The stopping structure 101 is arranged on an outer side of a bottom end of the hollow metal shaft 100; and the stopping structure 101 is one or more of a convex structure, a concave structure and an irregularly deformed structure.

In other embodiments of the present invention, a groove is provided in the outer wall of the annular boss of the iron core carrier. In this case, a projection fitted with the groove is provided on the inner wall of the motor iron core.

Connection between the hollow metal shaft 100 and the plastic shell 200 is one of injection molding connection, glue connection and interference connection.

In other embodiments of the present invention, it is not limited that there is a groove and/or a projection on the outer wall of the fixing end of the hollow metal shaft, and there may also be one or more of a convex structure, a concave structure and an irregularly deformed structure. The locking end of the hollow metal shaft is not limited to a threaded structure, a mortise and tenon structure and a snap-fit structure, it may also be other fastening structures suitable for detachable connection.

The fastening structure 102 is arranged on an outer side of a top end of the hollow metal shaft 100; and the fastening structure 102 may be one of a threaded structure, a snap-fit structure and a mortise and tenon structure.

Connection between the hollow metal shaft 100 and the plastic shell 200 may also be threaded connection, which may guarantee the tightness between the hollow metal shaft and the plastic shell.

In other embodiments of the present invention, the iron core carrier is fixedly connected with the motor end cover by a snap-fit structure or a binder.

Figure 11:
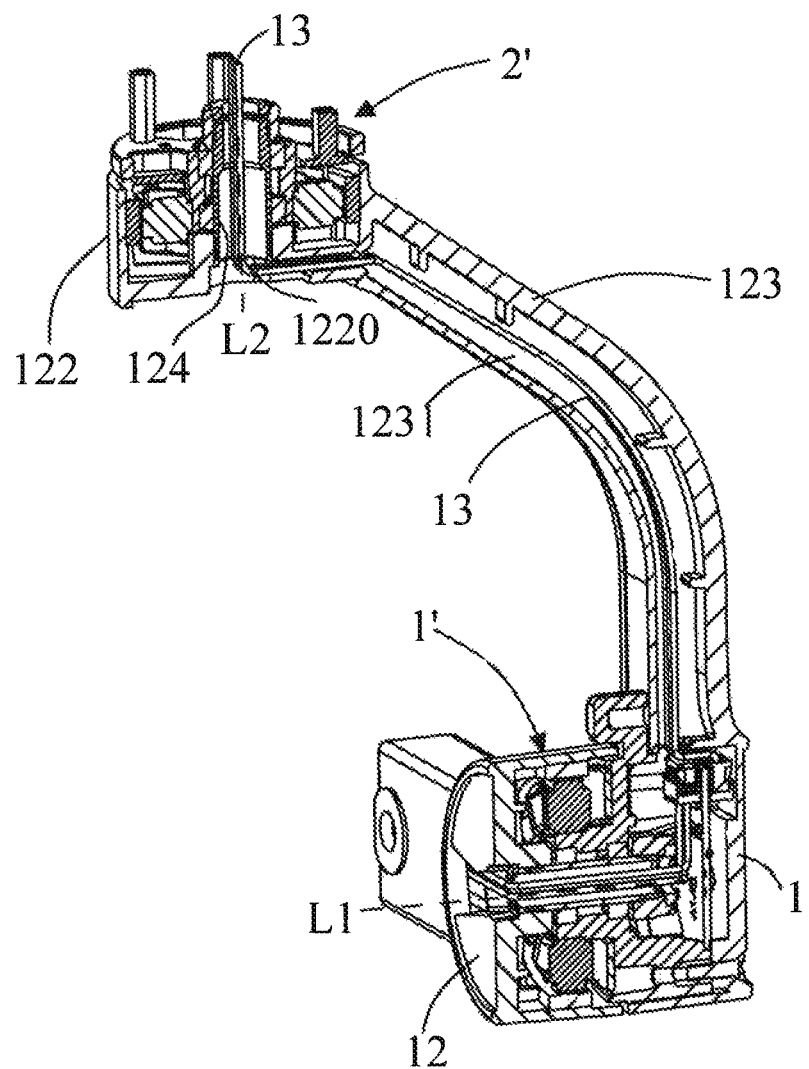
FIG. 11 is a sectional view of the handheld stabilizer of FIG. 1.

FIG. 11 is a sectional view of the handheld stabilizer of FIG. 1, wherein the sectional plane is a plane determined by central axes L1 and L2. As shown in FIG. 11, the motor shell 122 of the second plastic motor 2' is the same as the motor shell 12 of the first plastic motor 1', and a lead trough 1220 of the motor shell 122 is communicated with the interior of a hollow metal shaft 124 of the second plastic motor 2' as well. The connecting arm 123 connects the motor shell 122 of the second plastic motor 2' and the motor end cover 1 of the first plastic motor 1'. The connecting arm 123 is provided with a wiring groove 1231 which is communicated with the lead trough 1220 of the motor shell 122 and the interior of the motor end cover 1 of the first plastic motor 1'.

Some of leads in a lead strand 13 passing through the interior of the handle 127 (referring to FIG. 12) of the handheld stabilizer are used for powering the second plastic motor 2', and some of the leads pass through the interior of the hollow metal shaft 124, the lead trough 1220 of the motor shell 122 and the wiring groove 1231 of the connecting arm 123 in sequence to reach the interior of the motor end cover 1 for powering the first plastic motor 1'. In this way, it is convenient to arrange the lead strand 13 in the hollow metal shaft 124, the lead trough 1220 and the wiring groove 1231 without having to additionally provide a junction box on an outer wall of the plastic motor for arranging the leads. If it is needed to power a third motor, a third part of leads in the lead strand 13 can pass through the hollow metal shaft and the lead trough 202 on the motor shell 12 to reach a motor end cover of the third motor.

Figure 12:
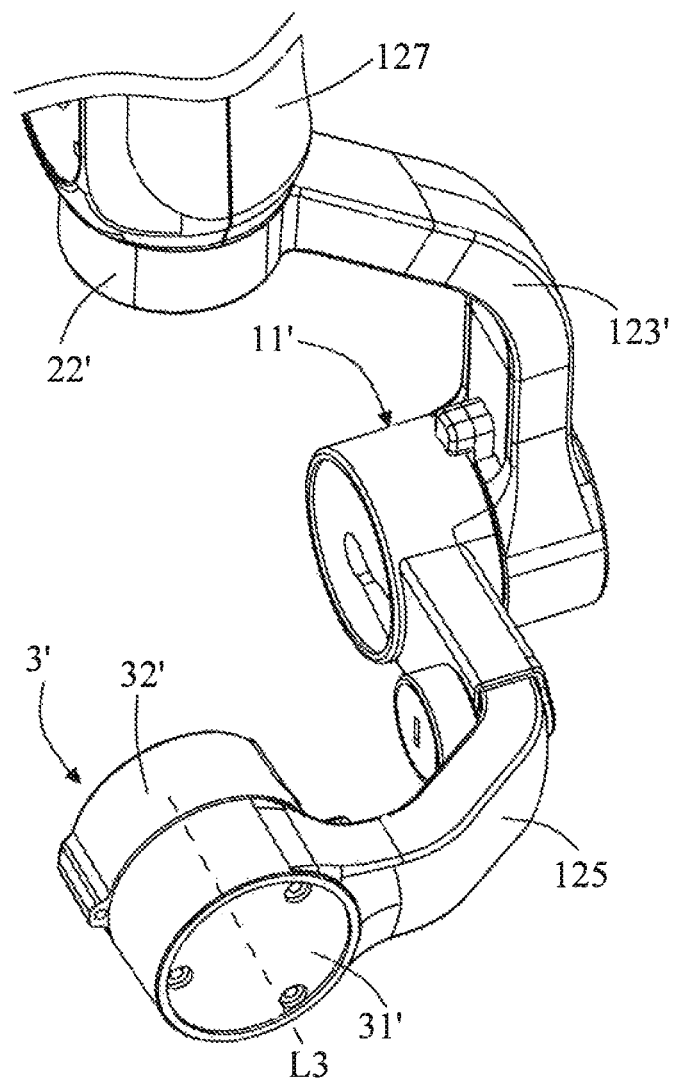
FIG. 12 is a schematic perspective view of a part of the handheld stabilizer according to the second embodiment of the present invention.

FIG. 12 is a schematic perspective view of a part of the handheld stabilizer according to the second embodiment of the present invention. FIG. 12 shows a part of the handheld stabilizer of FIG. 1, and a third plastic motor 3' and a connecting arm 125. A central axis L3 of the third plastic motor 3' is perpendicular to a central axis of a first plastic motor 11', thereby forming a three-axis handheld stabilizer.

The third plastic motor 3' similarly comprises a motor end cover 31' and a motor shell 32'. The connecting arm 125 fixedly connects the motor end cover 31' of the third plastic motor 3' and a motor shell of the first plastic motor 11' together. Some of leads arranged in the interior of the handle 127 pass through the interior of a hollow metal shaft of a second plastic motor 22', a lead groove of a motor shell of the second plastic motor 22', a wiring groove of a connecting arm 123', the interior of a motor end cover of the first plastic motor 11', a hollow metal shaft of the first plastic motor 11', a lead groove of the motor shell of the first plastic motor 11' and a wiring groove of the connecting arm 125 in sequence to reach the interior of the motor end cover 31' of the third plastic motor 3' for powering the third plastic motor 3'.

In this embodiment, the connecting arm 123' is used for connecting the motor shell of the second plastic motor 22' and the motor end cover of the first plastic motor 11', and thus the connecting arm 123' and the motor shell of the second plastic motor 22' can perform free clockwise or anticlockwise rotation around the handle 127. The connecting arm 125 is used for connecting the motor shell of the first plastic motor 11' and the motor end cover 31' of the third plastic motor 3', such that the connecting arm 125 and the motor shell of the first plastic motor 11' can perform free clockwise or anticlockwise rotation around the central axis of the first plastic motor 11', and the motor shell 32' of the third plastic motor 3' can perform free clockwise or anticlockwise rotation around its central axis L3.

The hollow metal shaft 100 and the plastic shell 200 are connected and molded by injection molding connection, glue connection and interference connection. The stopping structure 101 arranged on the outer side of the bottom end of the hollow metal shaft 100 can efficiently prevent displacement between the hollow metal shaft and the plastic shell. The fastening structure 102 arranged on the outer side of the top end of the hollow metal shaft 100 can facilitate tightness between the hollow metal shaft and bearings. The limiting stands 201 arranged on the inner wall of the plastic shell 200 can limit the mounting position for the magnetic ring of the motor. The lead trough 202 arranged on the plastic shell 200 can facilitate the motor's wiring. The plastic reinforcing ribs 203 arranged on the plastic shell 200 can guarantee the withstand strength of the shell.

Although the present invention has been described by way of preferred embodiments, the present invention is not limited thereto and further comprises various modifications and variations made without departing from the scope of the present invention.

The invention claimed is:

1. A motor shell, characterized in that it comprises a hollow metal shaft and a plastic shell, wherein the hollow metal shaft is fixedly connected to the plastic shell;
   wherein the plastic shell is of a cylindrical shape with one end open and comprises an annular wall and a bottom plate, the hollow metal shaft is arranged on a central axis of the plastic shell, and the hollow metal shaft is fixedly connected to an inner side of the bottom plate; and there is a lead trough on an outer side of the bottom plate, and the lead trough is communicated with the interior of the hollow metal shaft.

2. The motor shell according to claim 1, characterized in that the connection between the hollow metal shaft and the plastic shell is one of injection molding connection, glue connection and interference connection.

3. The motor shell according to claim 2, characterized in that a stopping structure is arranged on an outer side of a bottom end of the hollow metal shaft.

4. The motor shell according to claim 3, characterized in that the stopping structure is at least one of a convex structure, a concave structure and an irregularly deformed structure.

5. The motor shell according to claim 1, characterized in that a fastening structure is arranged on an outer side of a top end of the hollow metal shaft.

6. The motor shell according to claim 5, characterized in that the fastening structure is one of a threaded structure, a snap-fit structure and a mortise and tenon structure.

7. The motor shell according to claim 1, characterized in that the connection between the hollow metal shaft and the plastic shell is threaded connection.

8. The motor shell according to claim 1, characterized in that reinforcing ribs are arranged on the inner side of the bottom plate.

9. The motor shell according to claim 8, characterized in that it further comprises a magnetic ring and a plurality of limiting stands arranged on an inner side of the annular wall, wherein one end of each of the limiting stands is fixed to an end of the reinforcing rib and the other end thereof is abutted against the magnetic ring.

10. The motor shell according to claim 1, characterized in that there is a rotary stopper on an outer wall of the annular wall.

11. The motor shell according to claim 1, characterized in that the plastic shell and the hollow metal shaft form a motor shell for a handheld stabilizer.

12. The motor shell according to claim 1, characterized in that the plastic shell is made of polyaryl amides.

13. A motor, comprising the motor shell according to claim 1, a motor end cover, motor iron cores and an iron core carrier, wherein one end of the iron core carrier is detachably connected to the motor end cover and the other end thereof carries the motor iron cores.

14. The motor according to claim 13, further comprising an upper bearing and a lower bearing, wherein the upper bearing and the lower bearing are fixed on the iron core carrier, and the hollow metal motor shaft passes through the upper bearing, the iron core carrier and the lower bearing.

15. The motor shell according to claim 7, characterized in that the plastic shell is made of polyaryl amides.

16. The motor shell according to claim 11, characterized in that the plastic shell is made of polyaryl amides.

17. A motor, comprising the motor shell according to claim 1, a motor end cover, motor iron cores and an iron core carrier, wherein one end of the iron core carrier is detachably connected to the motor end cover and the other end thereof carries the motor iron cores.

18. A motor, comprising the motor shell according to claim 12, a motor end cover, motor iron cores and an iron core carrier, wherein one end of the iron core carrier is detachably connected to the motor end cover and the other end thereof carries the motor iron cores.

* * * * *